(12) United States Patent
Wippermann et al.

(10) Patent No.: US 8,641,936 B2
(45) Date of Patent: Feb. 4, 2014

(54) METHOD FOR MANUFACTURING AN OPTICAL STRUCTURE

(75) Inventors: Frank Wippermann, Meiningen (DE); Jacques Duparré, Jena (DE); Peter Dannberg, Jena (DE); Andreas Braeuer, Schloeben (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 13/327,066

(22) Filed: Dec. 15, 2011

(65) Prior Publication Data

US 2012/0182623 A1 Jul. 19, 2012

Related U.S. Application Data

(63) Continuation of application No. PCT/EP2010/069293, filed on Dec. 9, 2010.

(30) Foreign Application Priority Data

Dec. 21, 2009 (DE) .......................... 10 2009 055 088

(51) Int. Cl.
*B29D 11/00* (2006.01)

(52) U.S. Cl.
USPC .......... 264/1.36; 264/1.38; 264/1.7; 264/494; 264/340

(58) Field of Classification Search
USPC .......... 264/1.1, 1.36, 1.38, 1.7, 2.7, 494, 496, 264/340, 341, 317
See application file for complete search history.

(56) References Cited

U.S. PATENT DOCUMENTS

| 3,211,811 A | 10/1965 | Lanman |
| 4,113,224 A | 9/1978 | Clark et al. |
| 4,895,430 A | 1/1990 | Jalink et al. |
| 5,110,514 A | 5/1992 | Soane |

(Continued)

FOREIGN PATENT DOCUMENTS

| DE | 197 17 014 | 4/1997 |
| EP | 0322353 | 6/1989 |

(Continued)

OTHER PUBLICATIONS

Lim, Jiseok et al., "Fabrication of Hybrid Microoptics Using UV Imprinting Process with Shrinkage Compensation Method", Japanese Journal of Applied Physics, vol. 47, No. 8, 2008, 2008, 6719-6722.

*Primary Examiner* — Mathieu D. Vargot
(74) *Attorney, Agent, or Firm* — Perkins Coie LLP; Michael A. Glenn

(57) ABSTRACT

In a method for manufacturing a structure of curable material, a first structure from a first curable material is molded and cured on a substrate, and a second structure of a second curable material is molded and cured on a first surface of the first structure facing away from the substrate, so that at the first surface of the first structure a boundary surface forms between the first and second structures so that the first structure is not covered by the second structure in a passage area. A solvent is introduced into the passage area to dissolve the first curable material of the first structure so that a cavity forms between the second structure and the first surface of the substrate. After curing, the first curable material is soluble and the second curable material is insoluble for the solvent. An optical component and an optical layer stack are made of curable material.

8 Claims, 14 Drawing Sheets

(56) References Cited

U.S. PATENT DOCUMENTS

| | | |
|---|---|---|
| 5,269,867 A | 12/1993 | Arai |
| 5,510,818 A * | 4/1996 | Shimomura et al. ............ 347/65 |
| 5,944,324 A | 8/1999 | Schultheis et al. |
| 6,344,162 B1 | 2/2002 | Miyajima |
| 6,603,612 B2 | 8/2003 | Nakano |
| 6,621,631 B2 | 9/2003 | Lissotshenko et al. |
| 6,954,311 B2 | 10/2005 | Amanai |
| 7,567,754 B2 * | 7/2009 | Kinoshita ....................... 396/89 |
| 2002/0071190 A1 | 6/2002 | Wada et al. |
| 2005/0030647 A1 | 2/2005 | Amanai |
| 2005/0057734 A1 | 3/2005 | Johannes-Steven et al. |
| 2005/0094260 A1 | 5/2005 | Tokuda |
| 2005/0212156 A1 | 9/2005 | Tokita et al. |
| 2006/0114580 A1 | 6/2006 | Mori et al. |
| 2007/0159703 A1 | 7/2007 | Apel et al. |
| 2007/0190196 A1 | 8/2007 | Bandic et al. |
| 2008/0100934 A1 | 5/2008 | Webster et al. |
| 2008/0143019 A1 * | 6/2008 | Chou ............................ 264/293 |
| 2009/0015945 A1 | 1/2009 | Chen |
| 2009/0251800 A1 | 10/2009 | Iwai |

FOREIGN PATENT DOCUMENTS

| | | |
|---|---|---|
| EP | 0543 202 | 5/1993 |
| EP | 1630580 | 3/2006 |
| EP | 1705507 | 9/2006 |
| JP | H02-042568 | 2/1990 |
| JP | 04161305 | 6/1992 |
| JP | 06059104 | 3/1994 |
| JP | H08-320402 | 12/1996 |
| JP | H09-286038 | 4/1997 |
| JP | 11221842 | 8/1999 |
| JP | 2000227505 | 8/2000 |
| JP | 2001318288 | 11/2001 |
| JP | 2002350605 | 12/2002 |
| JP | 2004029554 | 1/2004 |
| JP | 2004088713 | 3/2004 |
| JP | 2004133073 | 4/2004 |
| JP | 2005018024 | 1/2005 |
| JP | 2005-300715 | 10/2005 |
| JP | 2006030894 | 2/2006 |
| JP | 2006267158 | 10/2006 |
| WO | WO-03004255 | 1/2003 |
| WO | WO-2005003820 | 1/2005 |
| WO | WO-2008059695 | 5/2008 |
| WO | WO-2008146644 | 12/2008 |
| WO | WO-2009069940 | 6/2009 |
| WO | WO-2009085883 | 7/2009 |
| WO | WO-2009110883 | 9/2009 |

* cited by examiner

METHOD FOR MANUFACTURING AN OPTICAL STRUCTURE

CROSS-REFERENCE TO RELATED APPLICATIONS

This application is a continuation of copending International Application No. PCT/EP2010/069293, filed Dec. 9, 2010, which is incorporated herein by reference in its entirety, and additionally claims priority from German Application No. 102009055088.7-51, filed Dec. 21, 2009, which is also incorporated herein by reference in its entirety.

The present invention relates to a concept for manufacturing a structure of curable material, like for example an optical lens.

BACKGROUND OF THE INVENTION

The parallelized manufacturing of optical microstructures in panels, like e.g. lenses for micro objectives for being used in mobile telephones, is based on the use of glass substrates onto which the optical structures are applied, e.g. by UV replication. FIG. 10a shows a lens reproduced or molded on a glass substrate by UV replication.

For mechanical reasons the substrates may fall below a critical thickness neither during manufacturing nor during operation, wherein the thickness that may be used increases with an increasing substrate diameter and is approximately 400 μm with an 8" substrate. As one or several substrates are located in the optical path of the optical system, a large thickness of the substrates influences the characteristics of the systems in two ways. On the one hand, the building length of the optics increases and on the other hand large lens thicknesses may lead to optical imaging errors. If, for fulfilling the function, several lenses may be used in the actual direction, several substrates with lens arrays are stacked one onto the other and connected to each other. Air spaces in the axial direction between the lenses here necessitate additional substrates comprising through holes which are to be manufactured with high precision and are to be joined.

FIGS. 10b and 10c show wafer stacks with lens fields and spacer wafers. In FIG. 10c, the spacer wafers are clearly indicated between each individual lens structure, which is why the building length of the optics is increased.

Newer approaches, like the so-called "monolithic lens technology" by a AJI may do without the use of a glass carrier and consist of UV replicable polymer material and may contain the spacer structures for generating air spaces in the axial direction between the lenses. If several lenses are used in the axial direction for fulfilling the optical function, also here several lens wafers are to be stacked on top of each other with high precision (some μm).

FIG. 10d exemplarily shows one of these optics on the basis of the "monolithic lens technology", as it is among others used by AJI. Problems mainly result when stacking several lens wafers on top of each other with high precision.

SUMMARY

According to an embodiment, a method for manufacturing an optical structure of curable material may have the steps of: molding and curing a first structure of a first curable material on a substrate; molding and curing a second structure of a second curable material on a first surface of the first structure facing away from the substrate, so that at the first surface of the first structure a boundary surface between the first structure and the second structure forms and so that the first structure is not covered by the second structure in a passage area; and introducing a solvent into the passage area after molding and curing the second structure in order to dissolve the first curable material of the first structure so that a cavity is formed between the second structure and a surface of the substrate, wherein the first curable material is soluble for the solvent after curing and the second curable material is insoluble for the solvent after curing.

According to another embodiment, an optical component of curable material may have: a layer stack having at least one optically relevant surface; a first main side; a second main side facing away from the first main side and having the optically relevant surface; and a passage; wherein the passage produces a fluidic connection from the first main side to the second main side laterally offset from the optically relevant surface; and wherein the passage passes laterally offset to the optically relevant surface in layer stacking direction.

According to another embodiment, an optical layer stack of curable material may have: optically relevant surfaces connected in series in layer thickness direction; and at least a first cavity between the optically relevant surfaces fluidically connected to the outside world; and at least one further cavity connected between a different pair of the optically relevant surfaces and fluidically connected to the first cavity.

A first aspect of the present invention is based on the finding that a structure, for example an optical microstructure of curable material having air spaces may be manufactured more cost effectively, when in one step of a method for manufacturing the structure from a curable material soluble by a solvent structures are molded, and in a later step, after molding further non-soluble curable materials, by introducing a solvent into a passage area which remained free when molding the further non-soluble materials and is fluidically connected to the soluble curable material, the soluble curable material is dissolved so that at the position of the structures air spaces form from the soluble curable material.

In one inventive method a first structure of a first curable material is molded and cured on a substrate. On a first substrate of the first structure facing away from the substrate then a second structure of a second curable material may be molded and cured so that at the first surface a boundary surface or interface between the first structure and the second structure is formed so that the first structure is not covered by the second structure at a passage area. Into the passage area then a solvent may be introduced in order to solve the first curable material of the first structure so that a cavity between the second structure and the first surface of the substrate is formed, wherein the first curable material, after curing, is soluble for the solvent and the second curable material, after curing, is non-soluble for the solvent.

It is thus one advantage of the present invention that by dissolving out the first structure cavities or air spaces may be created in an optical microstructure without stacking several glass substrates or polymer lens layers, as it is the case with the "monolithic lens technology", which thus leads to a more cost-effective and also building height-reduced manufacturing with a high lateral and axial precision of the optical microstructure, as the otherwise existing request for mechanical stability of the individual layers which exist insulated from each other before joining is omitted.

Further, in some embodiments of the present invention, the substrate on which the structures were molded and cured may be removed, the same may thus be very thick and further mechanically stable and in particular comprise an extremely low deflection or bending.

According to one embodiment of the present invention, further a third structure of a third curable material may be formed and cured on a first surface of the second structure facing away from the substrate, so that at the first surface of the second structure a boundary surface between the second structure and the third structure is formed so that the second structure is not covered by the third structure at the passage area and the third curable material is insoluble for the solvent. The second curable material and the third curable material may comprise different refractive indices after curing.

It is thus a further advantage of the present invention, that lens stacks may be molded on top of each other by molding several structures of curable materials on top of each other without additional substrates with through holes which may only be manufactured and joined in high precision. Thus, with embodiments of the present invention, a costly stacking of the individual molded structures in high precision on top of each other is omitted. As compared to conventional technology, this leads to an increased cost reduction and to a setup with higher precision.

It is a further aspect of the present invention that an optical component of curable material comprises better optical characteristics when a cavity is adjacent to an optically relevant surface of curable material of the optical component.

It is thus an advantage of the present invention that an optical component comprises a boundary surface between an optically relevant surface which is for example a boundary surface for curable material and an air space. Embodiments may thus comprise a higher refractive index leap and thus a higher refractive power, due to a transition from a curable material to air, than it is the case with optical components with transitions from glass to glass or glass to curable material or other materials.

According to one embodiment of the present invention, an optical component may also be formed from two curable materials, wherein the two curable materials comprise different refractive indices and wherein a boundary surface opposite the optically relevant surface is formed as an achromat between the two cured curable materials. It is one advantage of the present invention that by a boundary surface between the two curable materials having different refractive indices achromats for preventing chromatic aberrations may be provided.

It is a further advantage of the present invention that an optical component according to one embodiment of the present invention comprises no glass substrates between boundary surfaces of different curable materials, and may thus be manufactured more cost effectively and comprises a lower building height than comparable optical components known from conventional technology.

Embodiments of the present invention may further comprise cured curable material that is impermeable to radiation at their sides, which serves for suppressing false light.

Further, with embodiments of the present invention, any number of structures of curable material may be molded and cured on top of each other, wherein the structures which may for example be lenses may be selected as thin as possible, but any number of lenses arranged on top of each other may be created based on the thick temporary substrate used in manufacturing.

In particular, the structures molded on top of each other into layer stacks may comprise cavities between individual optically relevant surfaces of the layer stacks which are fluidically connected to each other and to the outside.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
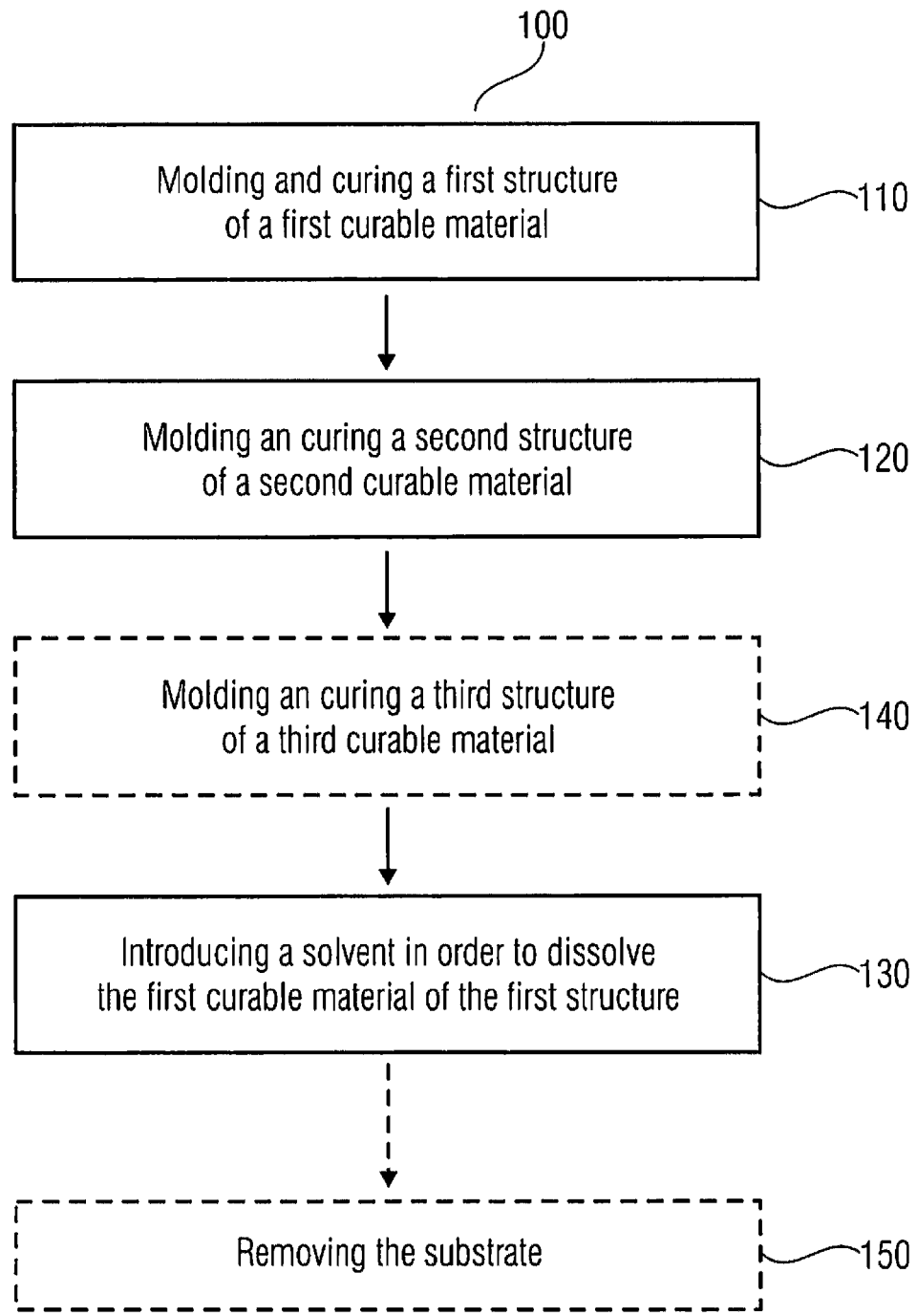
FIG. 1 shows a flowchart of a method for manufacturing a structure of curable material according to one embodiment of the present invention.

Before the invention is explained in more detail in the following with reference to the drawings, it is noted that like elements in the figures are provided with the same or similar reference numerals and that a repeated description of these elements is omitted.

FIG. 1 shows a flowchart of a method 100 for manufacturing a structure of curable material according to one embodiment of the present invention.

The method 100 includes a first step 110 of molding and curing a first structure of a first curable material on a substrate. Molding and curing may here be executed selectively regarding the location, so that a first area of a surface of the substrate is exposed.

Further, the method 100 includes a second step 120 of molding and curing a second structure of a second curable material on a first surface of the first structure facing away from the substrate so that at the first surface a boundary surface between the first structure and the second structure is formed and the first structure is not covered by the second structure at least at one passage area.

Further, the method 100 includes a third step 130 of introducing a solvent into the passage area in order to solve the first curable material of the first structure so that a cavity is formed between the second structure and the surface of the substrate, wherein the first curable material, after curing, is soluble for the solvent and the second curable material, after curing, is non-soluble for the solvent.

The solvent may for example be introduced into the passage area in which the structure to be manufactured comprising the first structure of the first curable material and the second structure of the second curable material is immersed into a solvent bath. The solvent may thus pass through the passage area to the first structure in order to dissolve the first curable material of the first structure, so that a free space is formed at the location where before the first structure was located. Further, the solvent may also be introduced specifically into the passage area, for example by specific or selective injection.

The structure to be manufactured may for example be a lens or an optical assembly comprising a lens stack for optical imaging. The curable materials may, for example, be UV curable polymers.

The method 100 may further include a step 140 of molding and curing a third structure of a third curable material on a first surface of the second structure facing away from the substrate. Here, at the first surface of the second structure a boundary surface is formed between the second structure and the third structure, wherein the first structure is not covered by the third structure at the passage area and wherein the third curable material is non-soluble for the solvent. The third curable material may here, for example, be different from the second curable material and comprise a different refractive index. Thus, at the boundary surface between the second structure and the third structure, e.g. an achromat is formed for correcting chromatic aberrations.

Step 140 is advantageously executed after step 120 and before step 130.

Further, the method 100 may comprise a step 150 of removing the substrate, which is advantageously executed after step 130.

Removing (150) of the substrate may for example be executed by sawing or milling.

According to further embodiments, step 150 of removing the substrate may be executed simultaneously to step 130 of introducing the solvent. This may for example be done by immersing the structure to be manufactured into a solvent bath in which both the first curable material of the first structure is dissolved and also the substrate is removed from the structure to be manufactured. The substrate may in this respect comprise curable material soluble by the solvent on its complete surface or parts of its surface, for example a first curable material or may at least partially be formed from soluble curable material. The first curable material may for example be arranged between the surface of the substrate and the second structure as a connecting material, so that when immersing the connecting material into the solvent bath the same is dissolved and a surface of the second structure adjacent to the connecting material forms a main side of the structure to be manufactured after removing the substrate.

According to further embodiments, before step 110 of molding and curing the first structure a spacer structure may be arranged on the substrate (for example be molded). Step 110 of molding and curing the first structure and step 120 of molding and curing the second structure are then executed in holes of the applied spacer structure. It is further possible that between the substrate and the spacer structure and the second structure (as already described above) soluble curable material is arranged to remove the structure to be manufactured and thus also the spacer structure from the substrate in step 150 of removing the substrate simultaneously with detaching or removing or dissolving out the first structure. The spacer structure, after removing the same from the substrate, forms circumferential sidewalls of the structure to be manufactured.

According to further embodiments of the invention it is also possible for any number of structures of curable material to be molded and cured on top of each other, wherein advantageously one or several passage areas for introducing the solvent, for dissolving the structures from the first curable material, are kept clear. The passage areas may, for example, be created by selective irradiation when curing the curable materials, i.e. only those areas of a curable material are irradiated which are to be present in the later optical component. Non-irradiated areas of curable material may be removed after selective curing. A passage area of a layer stack of structures molded on top of each other may then be implemented so that it fluidically connects all structures of the first curable material of the layer stack to the outside or exterior or outside world.

Further embodiments may further include a step of molding and curing further curable material, wherein the further curable material, at least after curing, is impermeable for radiation for a useful wavelength range of the structure to be manufactured. The further curable material may for example be a black polymer which forms a border of the structure to be manufactured after curing at a non-main side of the structure to be manufactured.

It is to be noted that in the subsequent FIGS. 2a to 8b at least two optical components each are illustrated. This is to illustrate that a manufacturing of the optical components in panels, i.e. in fields, is advantageous. It is in particular to be noted that molding the individual optical components illustrated in FIGS. 2a to 8b is executed on a common substrate wafer. The substrate wafer may be removed again in a later step 150. Although the respectively illustrated optical components in the subsequent FIGS. 2a to 8b are identical, the same may according to further embodiments be different from each other regarding their setup. In other words, on a common substrate wafer molded optical components may be different from each other regarding their parameters, like for example course of profile, thickness, boundary and distance to neighbors. This may for example be done by a locally selective molding and curing of the individual structures to be manufactured, i.e. the individual optical components.

Figure 2A:
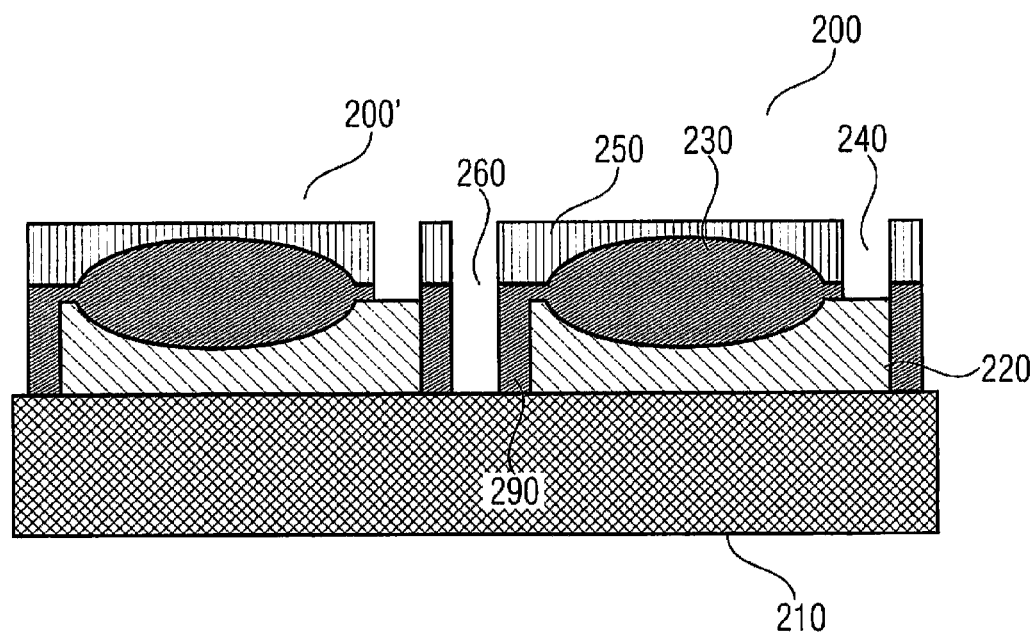
FIG. 2a shows a schematic illustration of the layer setup of an optical component according to one embodiment of the present invention before dissolving out individual layers.

FIG. 2a shows a schematic illustration of the layer setup of an arrangement for manufacturing optical components 200, 200' according to one embodiment of the present invention before dissolving out individual layers. The optical components 200 and 200' illustrated in FIG. 2a may for example be manufactured by a method 100 as it was described in FIG. 1, wherein step 130 of introducing solvent has not yet been executed. The optical components 200, 200' comprise a common substrate 210 and are identical regarding their setup, and thus, in the following, only the setup of the optical component 200 is described representative for the setup of the optical component 200'.

According to further embodiments, the optical components 200, 200' may be different from each other regarding both their shape and also their layer sequence, for example when a locally selective molding and curing is executed.

On a surface of the substrate 210 a first structure 220 was molded and cured locally selectively. Circulating the first structure 220 arranged on the surface of the substrate 210, a second structure 230 of a second curable material is arranged. Together with the surface of the substrate 210 the second structure 230 encloses the first structure 220, except for one or several passages 240. The second structure 230 is connected to the substrate 210 via a boundary area 290 of the second curable material. On a surface of the second structure 230 facing away from the first structure 220, a third structure 250 of a third curable material may be arranged.

The second structure 230 may for example be implemented as a converging lens having a concave curvature. The third structure 250 may for example be implemented as a plane-convex dispersing lens. The second curable material and the third curable material may, for example, be different regarding their refractive indexes in order to thus form an achromat for suppressing chromatic aberrations. Between the two optical components 200, 200' a free space 260 may be formed.

Further, the surfaces of the second structure 230 and the third structure 250 may comprise other random shapes like for example concave, convex, plane or freeform-type and others.

Figure 2B:
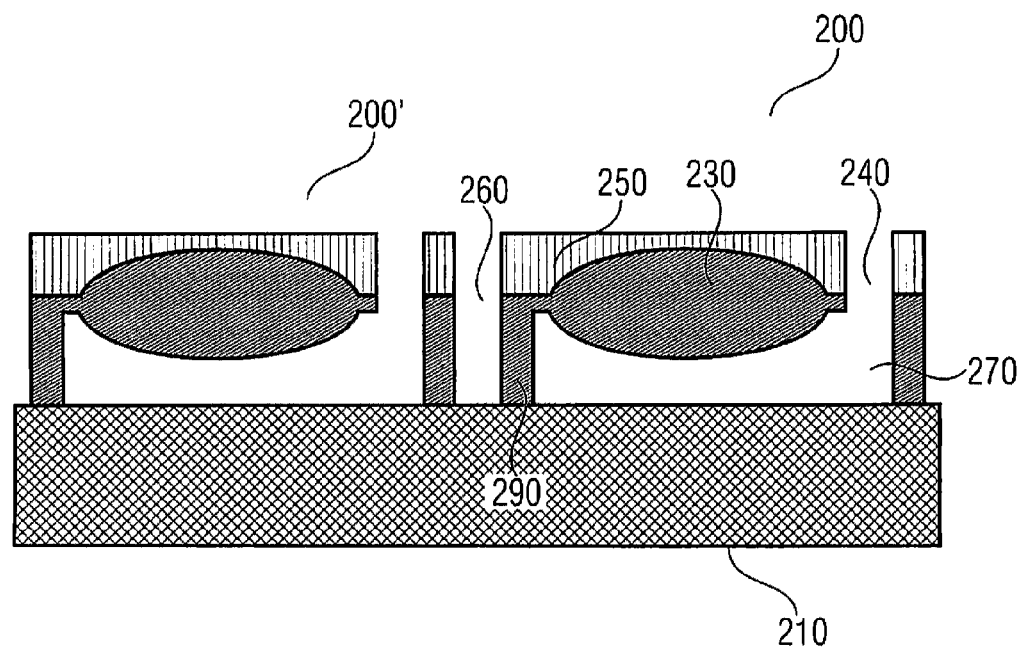
FIG. 2b shows a schematic illustration of the layer setup of the optical component of FIG. 2a after dissolving out individual layers.

FIG. 2b shows a schematic illustration of the layer setup of the arrangement of FIG. 2a after dissolving out individual layers, i.e. after dissolving out the first structure 220 from the first curable material. Dissolving the structure 220 from the first curable material may for example have been executed by step 130 as it was described in the method 100 described in FIG. 1. At the position of the original first structure 220 now an air space 270 is arranged. A boundary surface between the second structure 230 and the formed air space 270 thus comprises a high refractive index leap as compared to boundary areas between two different curable materials or also between one curable material and glass. Embodiments may thus comprise better refractive characteristics as compared to a lens of curable material molded on a glass substrate.

Figure 2C:
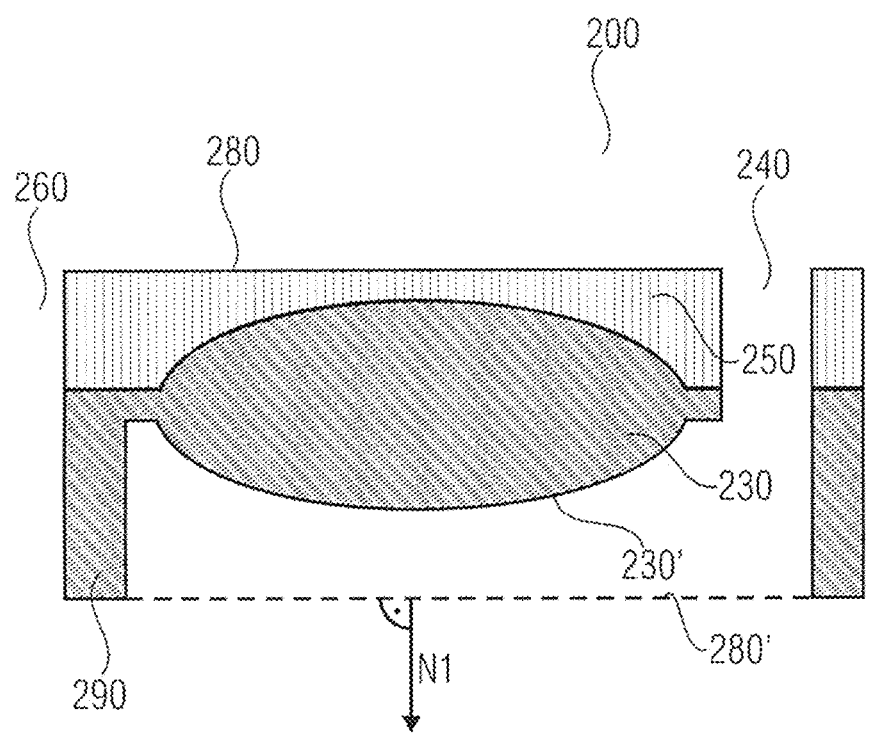
FIG. 2c shows a schematic illustration of the layer setup of the optical component of FIG. 2b.

FIG. 2c shows a schematic illustration of the layer setup of the optical component 200 of the arrangement of FIG. 2b according to one embodiment of the present invention. The optical component 200 comprises no substrate 210. Removing the substrate 210 may for example have been executed by a step 150 as it was described in the method 100 according to FIG. 1. The optical component 200 comprises a first main side 280 and a second main side 280' facing away from the first main side 280.

Further, the optical component 200 comprises the boundary area 290 and the passage 240, wherein the boundary area 290 is arranged between the second main side 280' and a boundary of an optically relevant surface 230' to space the optically relevant surface 230' in the normal direction N1 apart from the second main side 280', and wherein the passage 240, laterally offset from the optically relevant surface 230', provides a fluidic connection from the first main side 280 of the optical component 200 to the second main side 280.

The optically relevant surface 230' may for example be implemented as a concave, a convex, a plane or a freeform-type surface, for example a lens surface.

Although the optical component 200 illustrated in FIG. 2c comprises a third structure 250 of a third curable material, in further embodiments this third structure 250 may not exist or may be formed from the same curable material as the second structure 230.

Although in the concrete embodiment illustrated in FIG. 2c the substrate 210 has been removed completely, also other embodiments are applicable in which the substrate 210 is partially removed or not removed at all. Removing the substrate 210 for example in a step 150 of the method 100 may, for example, be executed by sawing or milling.

According to further embodiments, the step 150 of removing the substrate may be executed at the same time with step 130 of introducing the solvent. This may for example be done by immersing the arrangement of FIG. 2b into a solvent bath in which both the first curable material of the first structure 220 is dissolved and also the substrate 210 is removed from the optical components 200, 200'. In this respect, the substrate 210 may comprise curable material, for example a first curable material, soluble by the solvent on the complete surface facing the optical components 200, 200', or may at least partially be formed from soluble curable material.

Figure 3A:
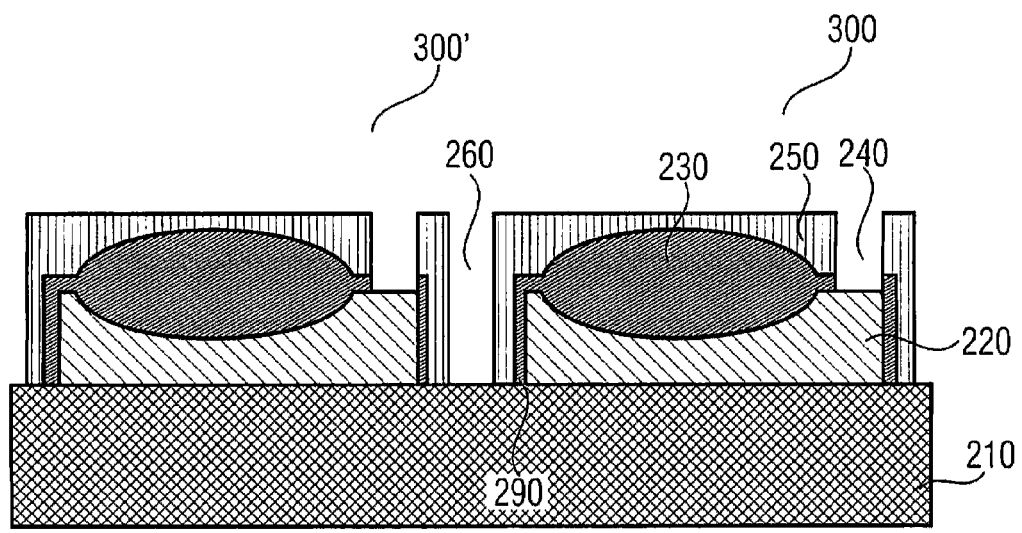
FIG. 3a shows a schematic illustration of the layer setup of an optical component according to on embodiment of the present invention before dissolving out individual layers.

FIG. 3a shows a schematic illustration of the layer setup of an arrangement for manufacturing optical components 300, 300' according to one embodiment of the present invention before dissolving out individual layers. The optical components 300, 300' illustrated in FIG. 3a are different from the optical components 200, 200' illustrated in FIG. 2a as the third structure 250 of the third curable material completely encloses the second structure 230 of the second curable material except for the passage 240, while with the optical components 200, 200' illustrated in FIG. 2a the third structure 250 of the third curable material is only arranged on a surface of the second structure 230 facing away from the substrate 210 and does not completely enclose the same.

Figure 3B:
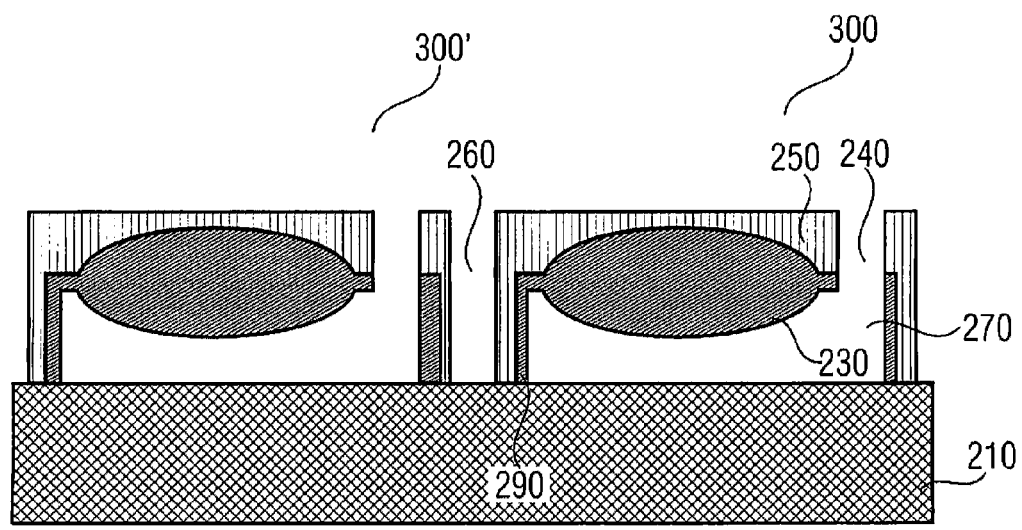
FIG. 3b shows a schematic layer setup of the optical component of FIG. 3a after dissolving out individual layers.

Analog to FIG. 2b, FIG. 3b shows a schematic illustration of the layer setup of the arrangement of FIG. 3a after dissolving out individual layers or after dissolving out the first structure 220 from the first curable material. Dissolving out the structure 220 from the first curable material may, for example, have been executed by a step 130 as it was described in method 100 described in FIG. 1. At the position of the original first structure 220 now an air space 270 is arranged.

Further, in further embodiments of the invention, the substrate 210 of the optical components 300, 300' may be removed, for example in a step 150 of the method 100, or may be downsized.

Figure 4A:
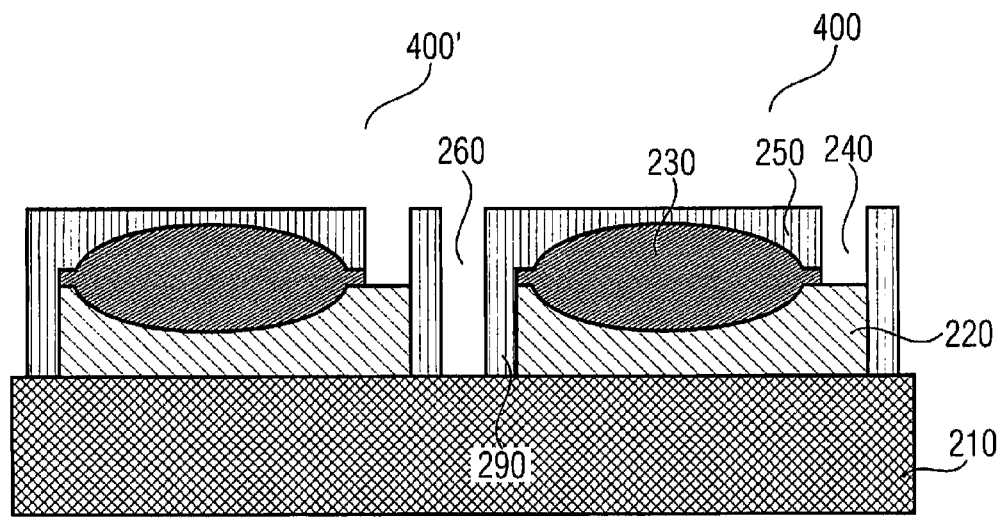
FIG. 4a shows a schematic illustration of the layer setup of an optical component according to an embodiment of the present invention before dissolving out individual layers.

FIG. 4a shows a schematic illustration of the layer setup of an arrangement for manufacturing optical components 400, 400' according to one embodiment of the present invention before dissolving out individual layers. The optical components 400, 400' illustrated in FIG. 4a are different from the optical components 200, 200', 300, 300' illustrated in FIGS. 2a and 3a as the second structure 230 of the second curable material is only arranged on a surface of the first structure 220 of the first curable material facing away from the substrate 210. The second structure 230 here encloses the first structure 220 not at its side edges as it was the case in the previously illustrated concrete embodiments. The edge area 290 connecting the substrate 210 the second structure 230 is thus formed from the third curable material and not from the second curable material in contrast to the previous embodiments.

Figure 4B:
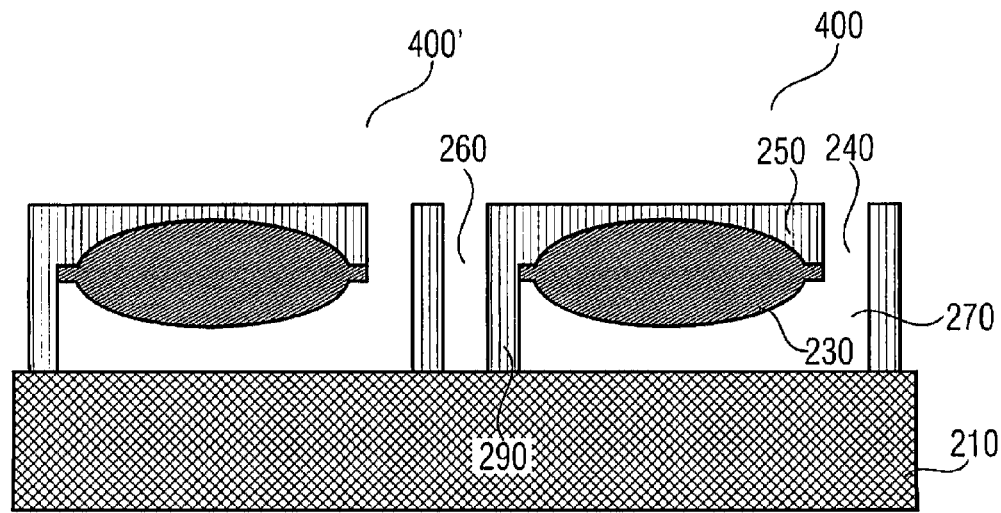
FIG. 4b shows a schematic illustration of the layer setup of the optical component of FIG. 4a after dissolving out individual layers.

Analog to FIGS. 2b and 3b, FIG. 4b shows a schematic illustration of the layer setup of the arrangement of FIG. 4a after dissolving out individual layers or after dissolving out the first structure 220 from the first curable material.

Dissolving out the structure 220 from the first curable material may, for example, have been executed by a step 130 as it was described in the method 100 described in FIG. 1. At the position of the original first structure 220 now an air space 270 is arranged.

Further, in further embodiments of the invention, the substrate 210 of the optical components 400, 400' may be removed, for example in a step 150 of the method 100, or may also be downsized.

In contrast to the optical components 200, 200', 300, 300' illustrated in FIG. 2b and FIG. 3b, in the concrete embodiment illustrated here, omitting the third structure 250 of the third curable material is not possible as the edge area 290 is also formed from the third curable material.

Figure 5A:
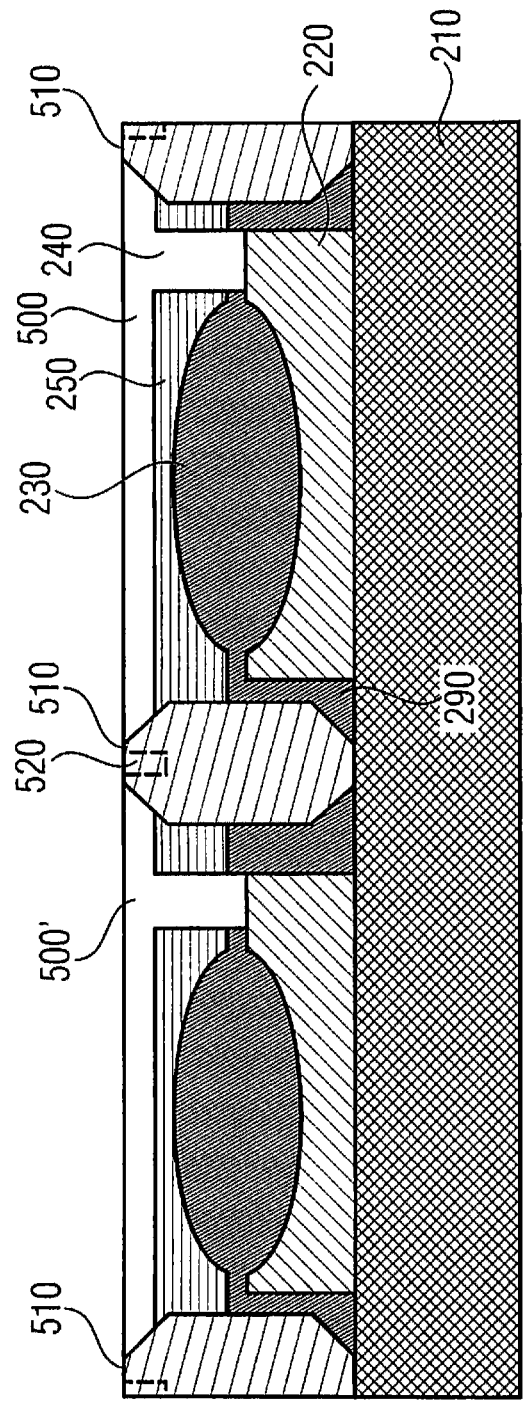
FIG. 5a shows a schematic illustration of the layer setup of an arrangement for manufacturing optical components according to one embodiment of the present invention before dissolving out individual layers using a spacer structure.
Figure 5B:
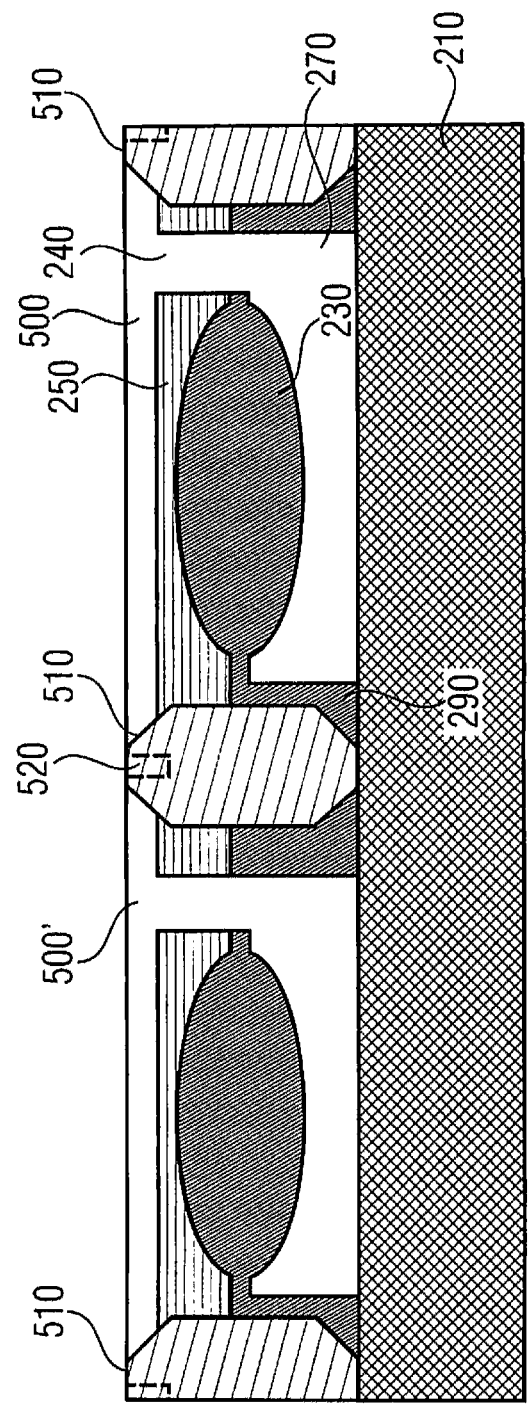
FIG. 5b shows a schematic illustration of the layer setup of the arrangement of FIG. 5a after dissolving out individual layers.

FIG. 5a shows a schematic illustration of the layer setup of an arrangement for manufacturing optical components 500, 500' according to an embodiment of the present invention before dissolving out individual layers using a spacer structure (so called "spacer wafer"). The arrangement of two optical components 500, 500' illustrated in FIG. 5a is different from the arrangement of optical components 200, 200' in FIG. 2a as in the free space 260 between the optical components 500, 500' spacer structures 510 of a further curable material are arranged.

In contrast to the second curable material and the third curable material the further curable material may not be transparent after curing.

Further, the spacer structures 510 here exemplarily each comprise a groove 520 for receiving a tongue at a surface facing away from the substrate. Further, the spacer structures 510 may comprise a further groove opposite the groove 520, for example at a surface facing the substrate 210. It is further possible that the spacer structures 510 comprise tongues for introducing the same into a groove, which may for example be arranged on the surfaces of the spacer structures 510 instead of or in addition to the groove. For example, a spacer structure 510 may comprise a tongue at a first surface and a groove at an opposite second surface.

The grooves or tongues may, for example, be integrated circumferentially around the optical components 500, 500' in the surfaces of the spacer structures 510 or also peripherally, i.e. may be formed only in certain areas of the surfaces of the spacer structures 510.

The spacer structures 510 of the non-transparent further curable material serve for suppressing false light, which would otherwise be incident over the edge of the optical components 500, 500' and thus decrease contrast or image quality of an optical imaging device in which the optical components 500, 500' are used. A cost and time consuming blackening of the sidewalls may thus be omitted as it is executed with prior optical microstructures.

The tongues and grooves 520 in the spacer structures 510 may serve for mounting optical components 500, 500' for example on an image sensor onto other optical components like e.g. lenses. By this, an expensive adjustment device may be omitted as it may be used with stacks of wafers comprising lens fields.

Analog to FIGS. 2b, 3b and 4b, FIG. 5b shows a schematic illustration of the layer setup of the arrangement of FIG. 5a after dissolving out individual layers or the first structure 220 from the first curable material.

Dissolving out the structure 220 from the first curable material may, for example, have been executed by a step 130 as it was described in the method 100 described in FIG. 1. At the position of the original first structure 220 now an air space 270 is arranged.

Further, in further embodiments of the invention, the substrate 210 of the optical components 500, 500' may be removed, for example in a step 150 of the method 100, or may also be downsized.

The spacer structures 510 may for example be arranged on the substrate 210 as a "spacer wafer", this "spacer wafer" may for example be formed of a non-transparent black material and comprise holes for components to be molded and possibly perforations for a more simple separation from the substrates 210. The spacer structures 510 then form circumferential walls around the holes of the "spacer wafer". The molding of the individual optical components (for example the optical components 510, 510') may then be done in the individual holes of the "spacer wafer". It may further also be possible that no "spacer wafer" is arranged on the substrate to form the spacer structures 510, for example when molding the optical components (for example the optical components 510, 510') is done in spatially separated modules (for example by selective irradiation and curing), so that after molding between the optical components free spaces remain (for example comparable to the free space 260 illustrated in FIG. 2a). Into these free spaces which remained free between the modules, black polymer may be cast and be cured there in order to form the spacer structures 510. The black polymer may here for example be thermally curable or UV curable.

The substrate 210 or the temporary wafer 210 may, for example, subsequently be separated by a solvent bath from the molded optical components, for example in a step 150 according to method 100. The molded optical components are then embedded into the spacer structures 510, i.e. the spacer structures 510 form circumferential sidewalls of the molded, optical components or components.

The optical components embedded into the spacer structures 510 thus form an optical component wafer and may then, after removing the substrate 210 by sawing, be separated by the spacer structures 510. It is, however, further possible for the optical component wafer to be arranged on a wafer having a plurality of image sensors and for the component wafer to be sawed subsequently together with the image sensor wafer (wafer level assembly). It is further possible that a plurality of optical components (for example 5×5 optical components) are associated with an image sensor. An optical component may then, for example, form an optical channel of the image sensor. The individual optical components may here be different from each other.

Figure 6A:
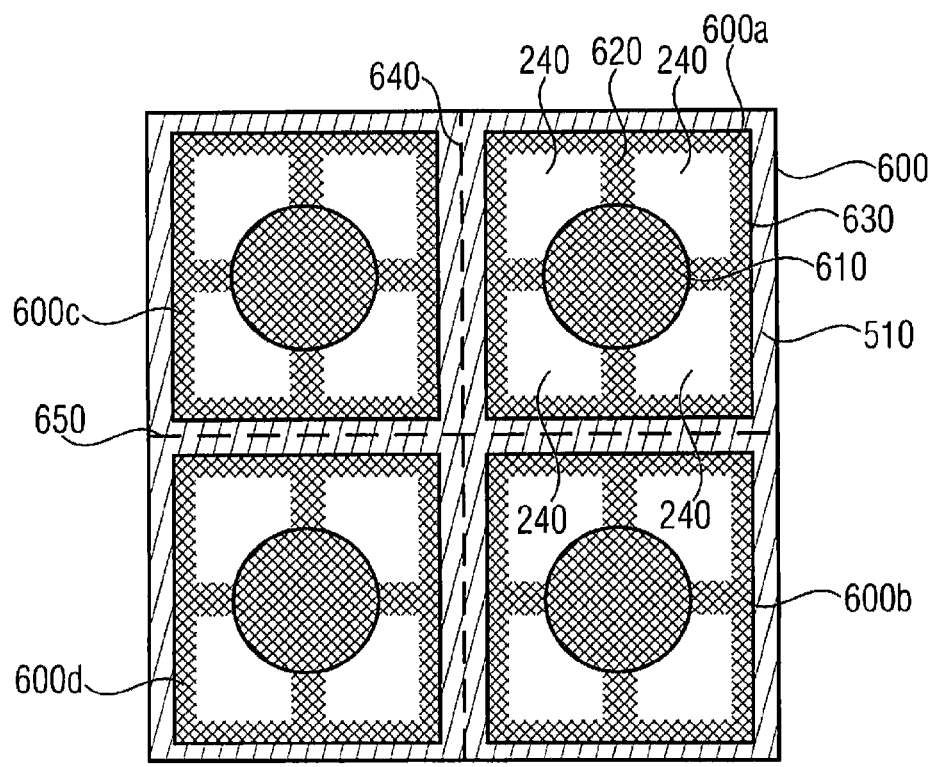
FIG. 6a shows a top view onto an arrangement of optical components according to one embodiment of the present invention comprising an integrated spacer structure.

FIG. 6a shows a top view onto an arrangement of optical components 600a-600d according to one embodiment of the present invention having an integrated spacer structure 510. The optical components 600a-600d illustrated in FIG. 6a each comprise an optically effective surface 610, for example a lens surface. Further, the optical components 600a-600d comprise a passage area 210 for introducing the solvent, for example to dissolve a first structure 220 from the first curable material, as illustrated in FIG. 2b. Further, the optical components 600a-600d comprise a bridge 620 between the optically effective surface 510 and a periphery 630 of the respective layer outside the optically effective surface 610. The spacer structure 510 each forms a border or boundary of the individual optical components 600a-600d. The individual optical components 600a-600d of the arrangement 600 may be separated in a further step, for example by sawing along the dashed lines 640 and 650. Each of the optical components 600a-600d then comprises a circumferential spacer structure 510. A subsequent blackening of the sidewalls of the optical components 600a-600d is then not necessary anymore.

Figure 6B:
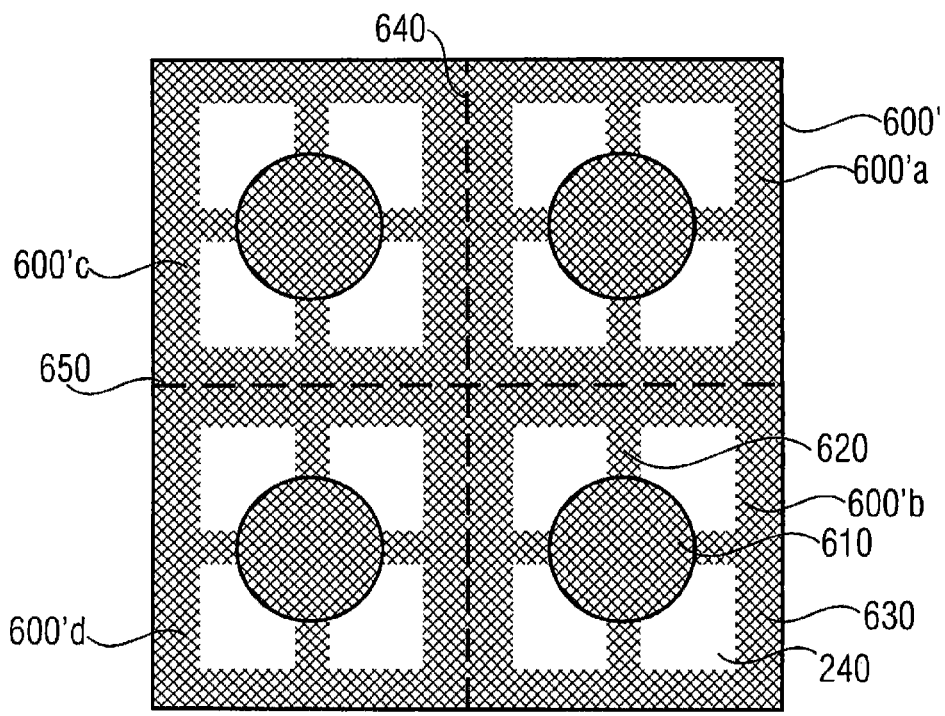
FIG. 6b shows a top view onto an arrangement of optical components according to one embodiment of the present invention without an integrated spacer structure.

FIG. 6b shows a top view onto an arrangement of optical components 600'a-600'd according to one embodiment of the present invention without an integrated spacer structure 510. The arrangement 600' illustrated in FIG. 6b is different from the arrangement 600 illustrated in FIG. 6a as no spacer structure 510 is arranged between the individual optical components 600'a-600'd. Also here, the individual optical components 600'a-600'd may be separated from each other for example by sawing along the dashed lines 640 and 650. For suppressing false light, the exterior walls, i.e. the sides of a periphery 630 of the individual optical components 600'a-600'd may be blackened.

According to further embodiments, with optical components having a plurality of layers molded on top of each other, in individual layer sheets a bridge 620 for connecting the optically active surface 610 to the periphery 630 may be omitted when in at least one other layer of the layer stack at least one such bridge 620 exists which connects the optically active surface 610 to the periphery 630.

It is further possible that the bridge 620 between the optically active surface 610 and the periphery 630 forms a continuous connection and this connection is only interrupted in one or several places in order to form the passage 240.

Figure 7A:
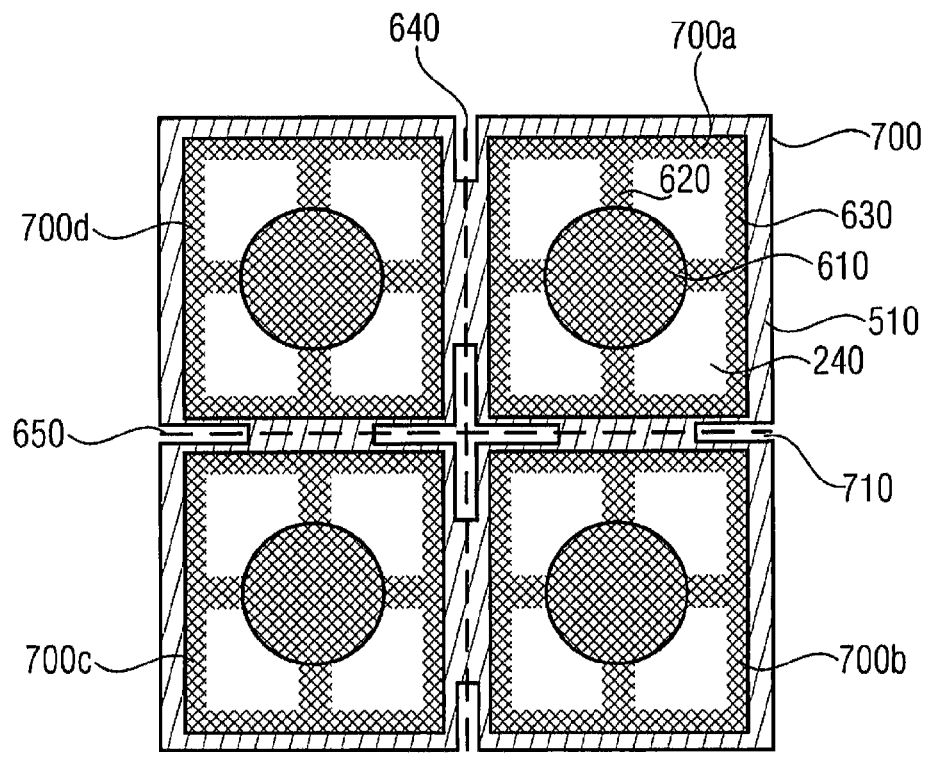
FIG. 7a shows a top view onto an arrangement of optical components according to one embodiment of the present invention comprising an integrated spacer structure.

FIG. 7a shows a top view onto an arrangement of optical components 700a-700d according to one embodiment of the present invention comprising an integrated spacer structure 510. The four optical components 700a-700d of the arrangement 700, analog to the optical components 600a-600d of the arrangement 600 illustrated in FIG. 6a comprise an optically active surface 610, for example a lens surface, one or several bridges 620, a periphery 630, one or several passage areas 240 and a spacer structure 510. In contrast to the arrangement 600 illustrated in FIG. 6a, the circumferential spacer structure 510 comprises perforations 710. The individual optical components 700a-700d of the arrangement 700 may be separated from each other in a further step, for example by sawing along the dashed lines 640 and 650, in particular perforations 710 may serve for easier sawing, as less material has to be removed by sawing. Further, a separation of the individual modules or the individual optical components 700a-700d may be executed by breaking along the break lines formed by the perforations 710, which reduces costs for the separation process. Each of the optical components 700a-700d then comprises a circumferential spacer structure 510.

It is again noted here, that this space structure 510 is advantageously formed from a non-transparent for example black curable material to suppress false light. A subsequent blackening of the sidewalls of the optical components 700a-700d is then no longer necessary.

Figure 7B:
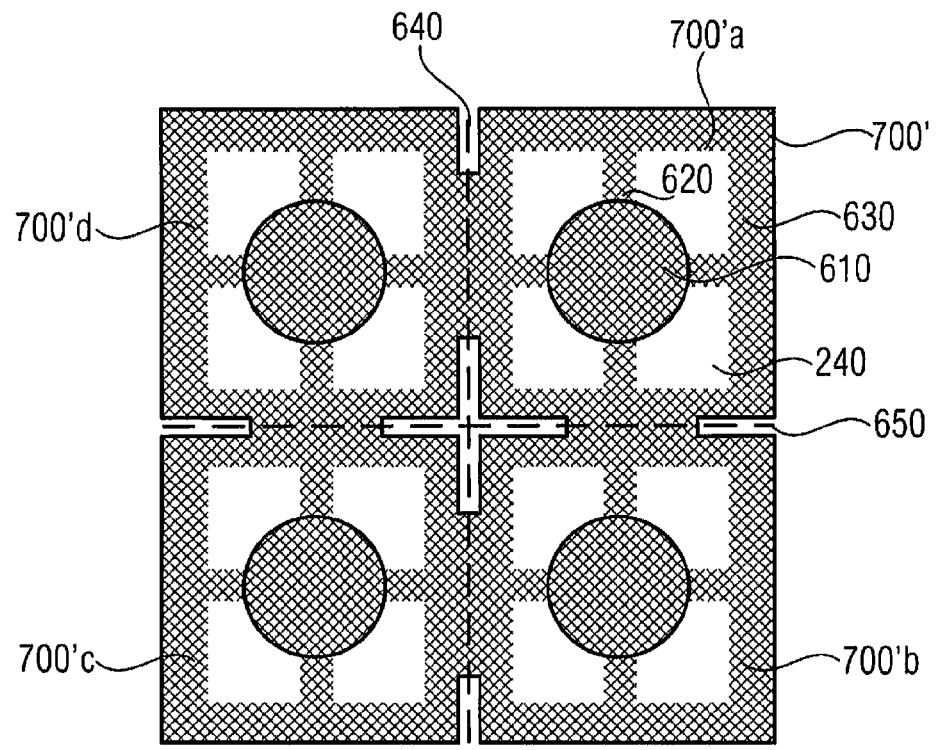
FIG. 7b shows a top view onto an arrangement of optical components according to one embodiment of the present invention without an integrated spacer structure.

FIG. 7b shows a top view onto an arrangement of optical components 700'a-700'd according to one embodiment of the present invention without an integrated spacer structure 510. The arrangement 700' as illustrated in FIG. 7b is different from the arrangement 700 illustrated in FIG. 7a as no spacer structure 510 is arranged between the individual optical components 700'a-700'd. Also here the individual optical components 700'a-700'd may be separated from each other for example by sawing along the dashed lines 640 and 650. For suppressing false light, the exterior walls, i.e. the sides of the periphery 630 of the individual optical components 700'a-700'd may be blackened.

Figure 8A:
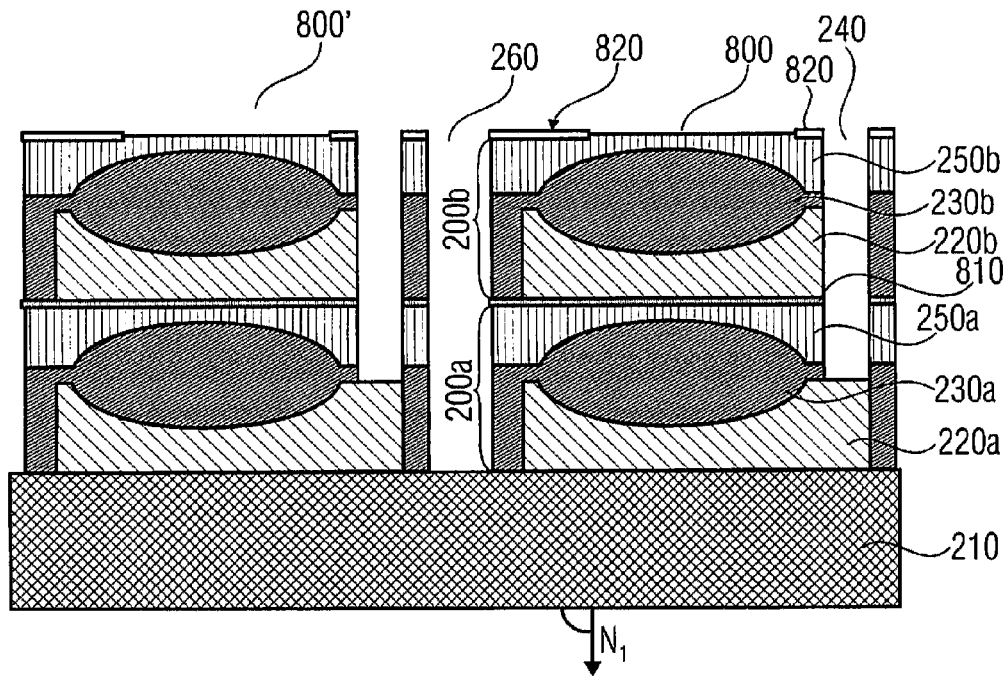
FIG. 8a shows a schematic illustration of the layer setup of the optical component according to one embodiment of the present invention before dissolving out individual layers.

FIG. 8a shows a schematic illustration of the layer setup of an arrangement for manufacturing optical components 800, 800' according to one embodiment of the present invention before dissolving out individual layers or the first structure 220. Each of the optical components 800, 800' illustrated in FIG. 8a comprises a layer stack arranged in the normal direction of two optical components 200 as they were described in FIG. 2a. The optical components 800, 800' comprise a common substrate 210, and between the two optical components 800, 800' a free space 260 is formed. The two optical components 800, 800' are exemplarily identical regarding their setup here, thus in the following only the setup of the optical component 800 is described being representative for the setup of the optical component 800'. It is to be noted, however, that it is also possible that the optical components 800, 800' are not identical and deviate from each other in particular regarding shape and/or layer sequence. A first optical component 200a of the layer stack of the optical component 800 is arranged on the substrate 210. On a surface of the third structure 250a of the of the first optical component 200a facing away from the substrate 210 a layer 810, for example a dielectric layer 810 is arranged which may also be implemented as a layer stack of several individual layer sheets. The dielectric layer 810 is advantageously transparent. A second optical component 200b of the layer stack of the optical component 800 is arranged adjacent to a surface of the layer 810 facing away from the substrate 210. On a surface of the third structure 250b of the second optical component 200b facing away from the substrate 210, a layer 820, for example made of metal, is arranged. The layer 820 may thus form an aperture stop of the optical component 800. The two optical components 200a, 200b of the optical component 800 were not stacked onto each other as previously separately manufactured components (wafers) as it is known from conventional technology, but molded on top of each other in several molding processes. This may, for example, have been executed in a method according to an embodiment of the present invention, in which steps 110, 120, 140 were executed repeatedly one after the other. It is to be noted here that the passage area 240 is connected fluidically to all structures of the first curable material which is soluble for the solvent.

Figure 8B:
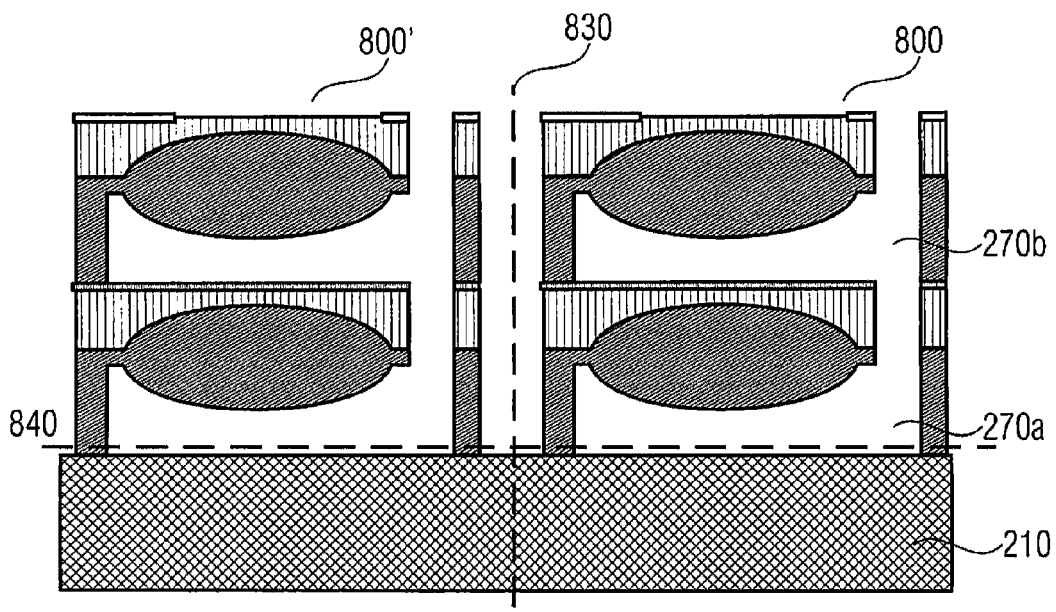
FIG. 8b shows a schematic illustration of the layer setup of the optical component of FIG. 8a after dissolving out individual layers.

FIG. 8b shows a schematic illustration of the layer setup of the arrangement of FIG. 8a after dissolving out individual layers or the first structures 220a, 220b from the first curable material. The first structures 220a, 220b may, for example, have been dissolved out by introducing the solvent, as it was described in step 130 of method 100 according to FIG. 1. Instead of the first structures 220a, 220b thus air spaces 270a, 270b are formed.

According to further embodiments, in the free space 260 a non-transparent, curable (for example thermally curable) material may be filled and cured in order to form a spacer structure (comparable to the space structure 510 according to FIGS. 5a and 5b) which serves for suppressing false light in the optical components 800, 800'.

The optical components 800, 800' may be removed from the substrate 210 and be separated from each other for example by sawing along the dashed lines 830 and 840.

Further, according to further embodiments, the optical components 800, 800' may be separated from the substrate 210 by immersing the optical components 800, 800' into a solvent bath. For example, simultaneously to dissolving out the first structures 220 from the first curable material. Between the substrate 210 and the optical components 800, 800' here, for example, a complete or selective layer of the first curable material may be arranged which dissolves when immersing the optical components 800, 800' into the solvent bath, whereby the connection between the optical components 800, 800' and the substrate 210 is also dissolved and the optical components 800, 800' are separated.

Figure 8C:
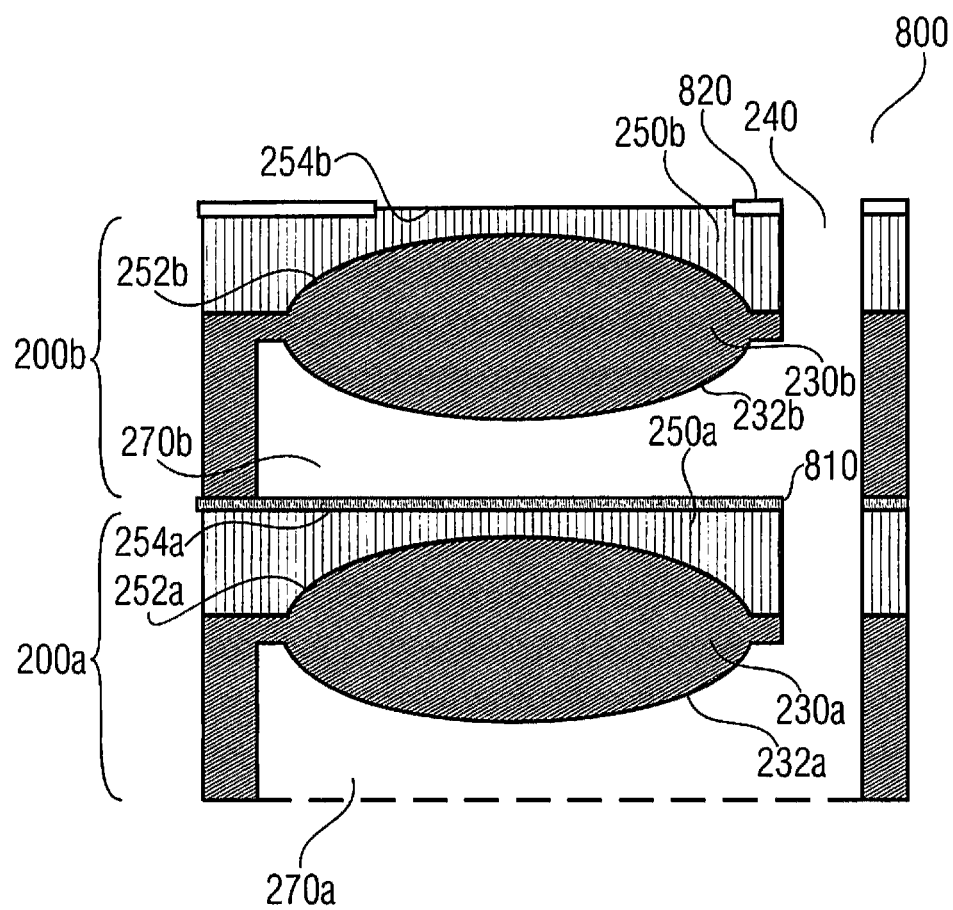
FIG. 8c shows a schematic illustration of the layer setup of the optical component of FIG. 8b.

FIG. 8c shows the optical component 800 separated from the optical component 800' and separated from the substrate 210. The optical component 800 thus forms a layer stack 800 of curable material having optically relevant surfaces connected one after the other in layer thickness direction, structures 230a, 230b, 250a, 250b of the optical components 200a, 200b. The second structure 230a of the optical component 200a comprises a first optically relevant surface 232a. Between the second structure 230a of the first optical component 200a and the third structure 250a of the first optical component 200a a second optically relevant surface (for example a first boundary surface) 252a of two different curable materials (i.e. of the second curable material of the second structure 230a and the third curable material of the third structure 250a) is formed. Further, the third structure 250a of the first component 200a comprises a third optically relevant surface 254a. Between the third optically relevant surface 254a and a fourth optically relevant surface 232b of the second structure 230b of the second optical component 200b the cavity 270b is formed. Between the third optically relevant surface 254a and the cavity 270b the dielectric layer 810 may be formed which may be irrelevant for the optical characteristics of the layer stack 800. Between the second structure 230b of the second optical component 200b and the third structure 250b of the second optical component, a fifth optically relevant surface (for example a second boundary surface) 252b of two curable materials is formed. Further, the third structure 250b of the second optical component 200b comprises a sixth optically relevant surface 254b above which for example the metallic layer 820 may be structured.

The layer stack 800 thus comprises optically relevant surfaces connected one after the other in layer thickness direction (a first optically relevant surface 232a, a second optically relevant surface 252a, a third optically relevant surface 254a, a fourth optically relevant surface 232b, a fifth optically relevant surface 252b, a sixth optically relevant surface 254b).

The two cavities 270a, 270b are connected to the outside world or outside fluidically by the passage 240 or the channel 240. In this respect, the channel 240 may pass laterally offset to the optically relevant surfaces in layer thickness direction. According to further embodiments, also several channels 240 may be implemented. In particular, the channels 240 may also pass in parallel to the optically relevant surfaces or in any direction in order to connect cavities of the optical layer stack to each other and to produce a connection to the outside world.

The optically relevant surfaces 252a, 252b of two different curable materials having different refractive indices, together with the optically relevant surfaces 232a, 232b and 254a, 254b, form achromats in order to reduce chromatic aberrations.

Although the optically relevant surfaces connected one after the other illustrated in FIG. 8c are partially identical, in further embodiments the optically relevant surfaces of the layer stack may deviate from each other and thus comprise different refractive characteristics. Further, in further embodiments the dielectric layer 810 may not be dielectric or may be completely omitted. Further, in further embodiments the layer 820 may not be metallic or may be omitted.

According to further embodiments, the dielectric layer 810 or the dielectric layer stack 810 may serve for setting the transmission performance of the optical layer stack 800. The dielectric layer 810 or the dielectric layer stack 810 may here, for example, serve as an anti-reflective layer or as a filter layer, for example to block incoming radiation of certain wavelength ranges (for example in the infrared range).

According to further embodiments, after a layer 820 (for example a metallic stop layer) a dielectric layer 810 or a dielectric layer stack 810 may follow and vice versa. In other words, one or several above-described layers 820 (for example, metallic stop layers) and also one or several dielectric layers 810 or dielectric layer stacks 810 may be arranged in any position in an optical layer stack 800 in order to guarantee a desired optical function of the optical layer stack 800.

Further, in further embodiments the third structures 250a, 250b may be made of the same curable material as the second structures 230a, 230b or may be omitted.

Although in the concrete embodiment illustrated in FIG. 8c the two structures 230a, 230b are formed of the same material, in further embodiments the second structures 230a, 230b may be formed of different materials. This also applies to the third structures 250a and 250b.

Although the optical component 800 or the layer stack 800 illustrated in FIG. 8c is formed of an arrangement of two optical components 200a, 200b, it may in further embodiments also be formed from any number of optical components 200, 300, 400, 500. In other words, the optical component 800 may form a layer stack 800 of any number of randomly formed optically relevant surfaces molded on top of each other. Between individual ones of those optically relevant surfaces, cavities may be formed which are, for example, fluidically connected to each other and to the outside world, for example via a channel which passes laterally offset to the optically relevant surfaces through the layer stack in layer thickness direction or in layer stacking direction.

Further, the optical component 800 or the layer stack 800 illustrated in FIG. 8c may comprise a border 510, for example made of curable non-transparent material, like for example a spacer structure 510 (as it was described in FIG. 5). Further, the border 510 may comprise tongues or grooves. The grooves or tongues may for example be integrated circumferentially around the optical component 800 in the surfaces of the border 510, or also peripherally, i.e. only in certain areas of the surfaces of the border 510. Further, the border 510 may comprise perforations (so called dicing reliefs), comparable to the perforations 710 according to FIG. 7.

Figure 9:
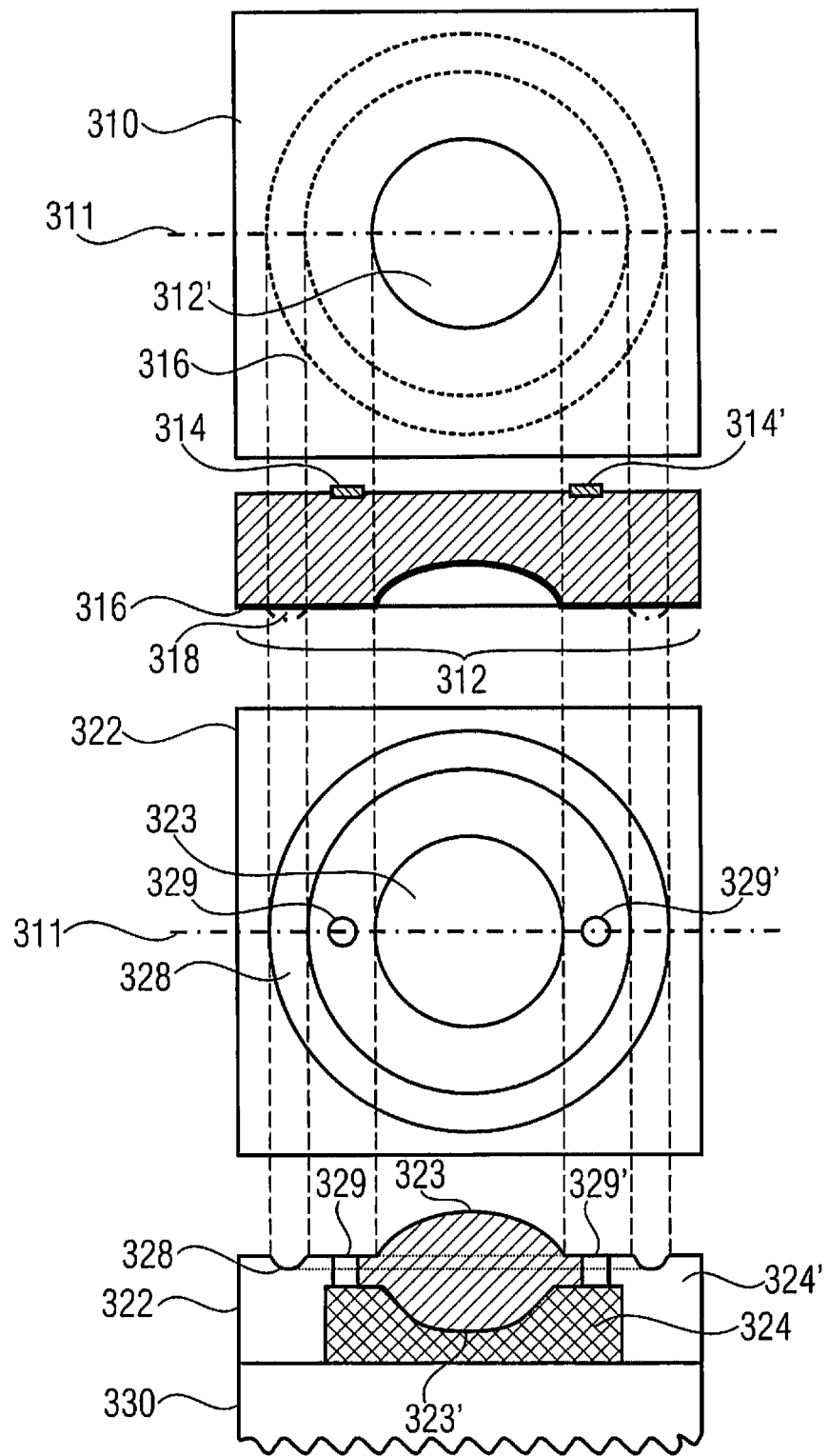
FIG. 9 shows a bottom view and a sectional view of a molding tool and a top view onto a molded element and a sectional view of the same.
Figure 10A:
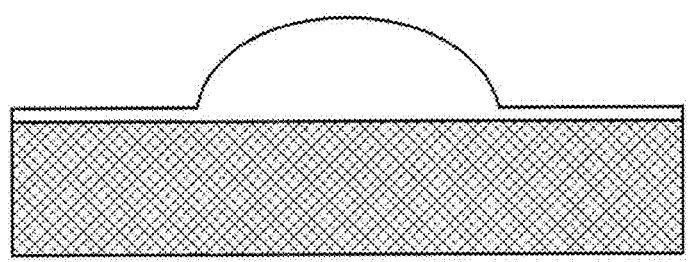
FIG. 10a shows a schematic illustration of a lens molded onto a substrate.
Figure 10B:
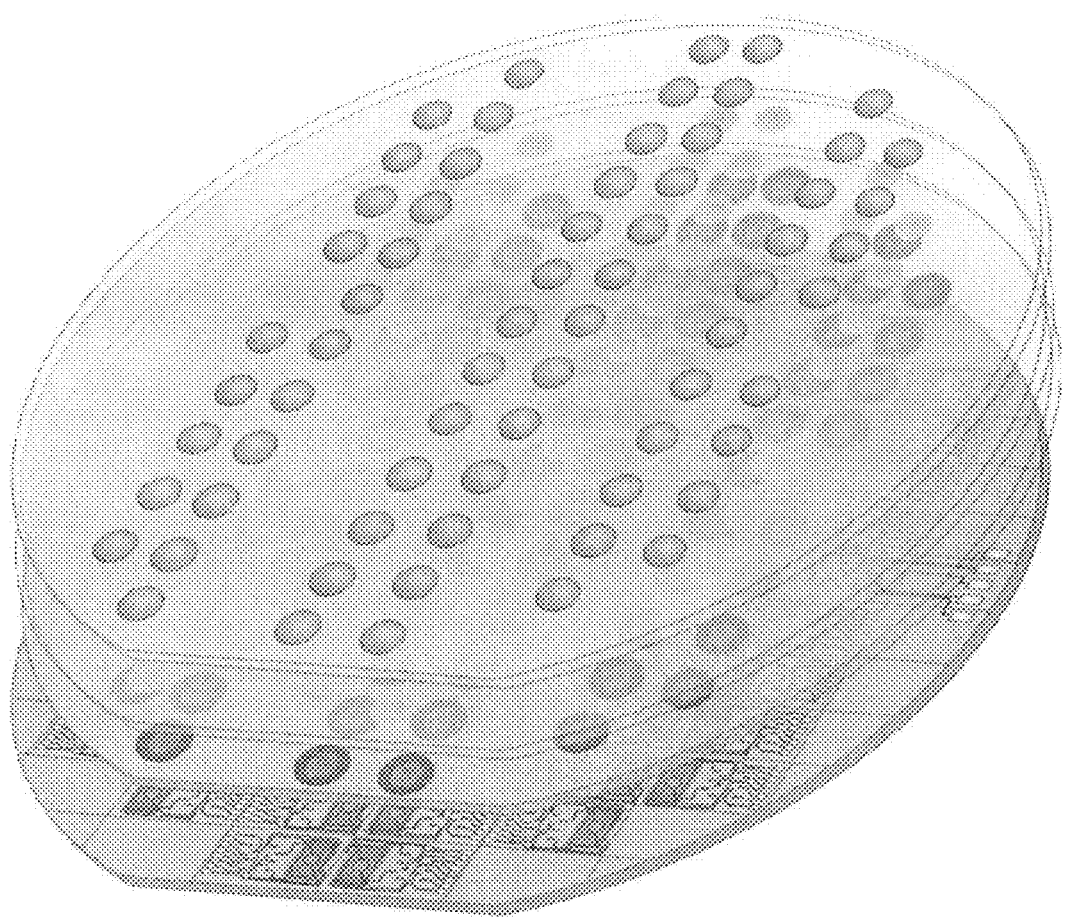
FIGS. 10b to 10d show a schematic illustration of already known devices for optical imaging.
Figure 10C:
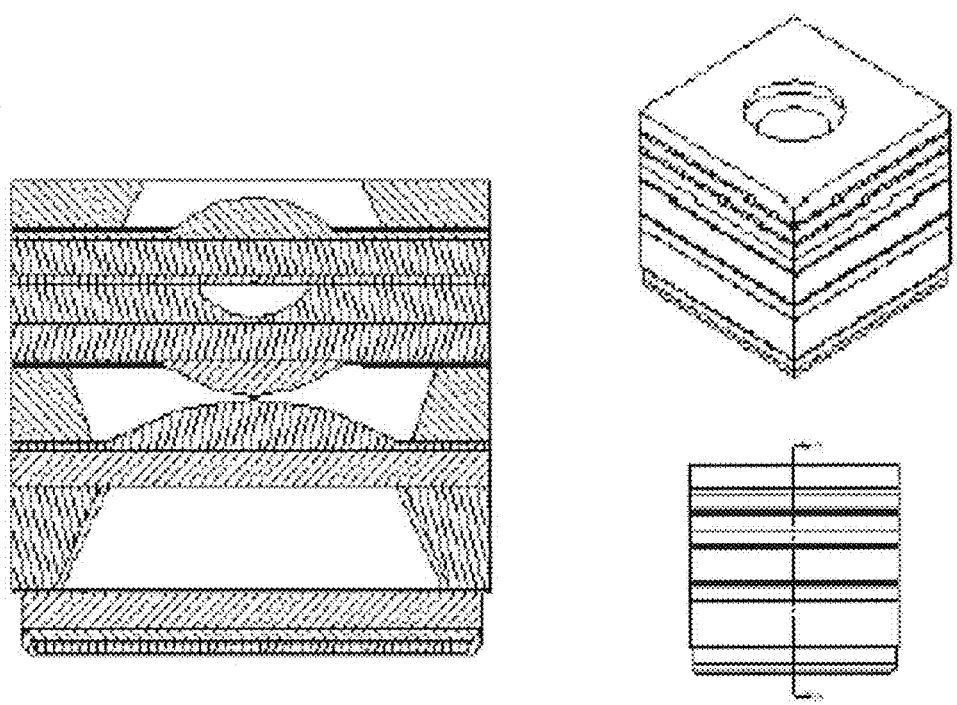
Figure 10D:
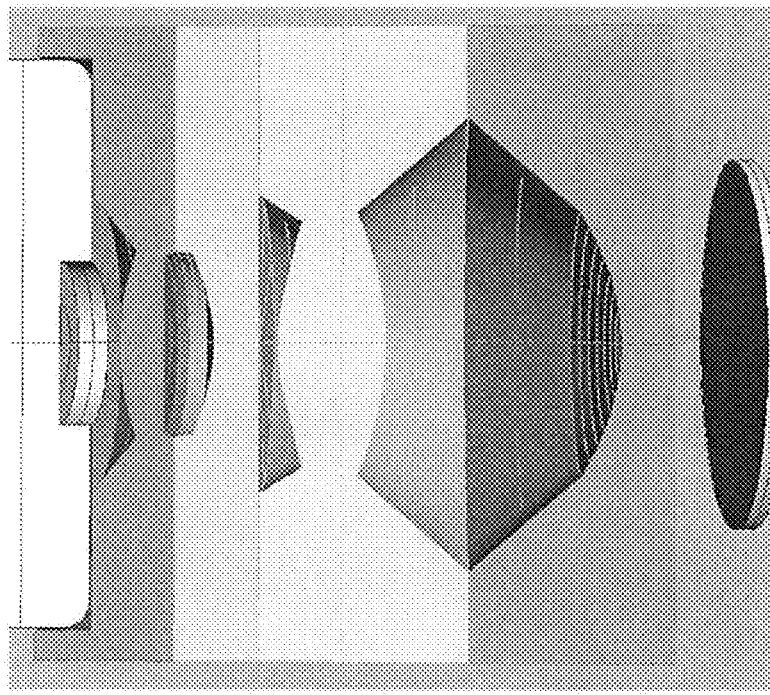

FIG. 9 shows a bottom view of a molding tool 310 and a sectional view of the molding tool 310 and a top view onto a molded element 322 and a sectional view of the molded element 322.

The sectional views of the molding tool 310 and the molded element 322 illustrated in FIG. 9 each resulted from a cut by the molding tool 310 or the molded element 322 along a cutting axis 311.

The molding tool 310 illustrated in FIG. 9 comprises a molding surface 312 with an optical functional surface area 312'. The molding surface 312 faces the surface 330, when the molding tool 310 is placed on a surface 330 or arranged on top of the same. The molded element 322 illustrated in FIG. 9 comprises a first structure 324 of a first curable material which was molded on a surface 330 in a previous step. The first structure 324 is completely surrounded by a second structure 324' of a second curable material, except for the area of the surface 330. The second structure 324' was molded on the first structure 324 using the molding tool 310. The first curable material is here soluble for a solvent after curing, while the second curable material is non-soluble for the solvent after curing.

The optical functional surface area 312' of the molding tool 310 serves for defining an optically relevant surface 323 of the molded element 322.

Further, the molding tool 310 comprises a circumferential, elastic membrane 316 at the molding surface 312. The elastic membrane 316 here exemplarily covers the molding surface 312 completely, although a partial coverage would also be possible, and is non-adhesive in a circulation or circumferential area which forms a laterally closed path around the optical functional surface area 312' but is connected to the molding surface 312 at the borders of the circumferential area so that when applying pressure to the fluid, like e.g. air, between the molding surface 312 and an interior side of the elastic membrane 316, a channel 318 forms which protrudes in the direction of the surface 330 when the molding tool 310 is placed on the surface 330, in order to displace not yet cured curable material there and thus increase the pressure of the latter material. Applying pressure in the elastic membrane 316 and thus generating the channel 318, during the molding and curing step leads to a flow of further curable material in the area of the optically relevant surface 323 of the molded element 322 in order to compensate for a shrinking of the polymer volume during curing. The channel 318 generated by the membrane 316 under pressure during a molding and curing step leaves a circumferential trench 328 in the molded element 322 which may, however, remain without further meaning.

Further, the molding tool comprises a first diaphragm structure 314 and possibly further diaphragm structures 314'. The diaphragm structures 314, 314' serve for shielding areas which are not to be cured during an irradiation through the molding tool 310. The diaphragm structures 314, 314' thus in the molded element 322 lead to a channel 329 passing perpendicular to the surface 330 through the second structure 324' and a further channel 329' passing perpendicular to the surface 330 through possibly existing second structures 324', wherein in the channels after a cleaning process or developing process no cured material is arranged. The channels 329, 329' may, for example, be used for introducing a solvent, for dissolving soluble curable material (like for example the first curable material of the first structure 324) in order to generate air spaces.

The channels 329, 329' fluidically connect the first structure 324 to the exterior world or form a fluidic connection out of the molded element 322 for example to introduce a solvent. The first structure 324 may then be dissolved by introducing a solvent through the channels 329, 329', so that a cavity forms between a further optically relevant surface 323' of the second structure 324' and the surface 330 which is fluidically connected to the outside. The surface 330 may for example be a substrate or a further optically relevant surface which was molded in a previous step before molding the first structure 324.

The solvent for dissolving the first curable material may be a gaseous or also a liquid solvent. The curable materials may for example be UV-curable materials or thermally curable materials.

In summary, it may be noted that embodiments relate to an arrangement and a method for a cost-effective realization of opto-electronical-mechanical structures and in panel manufacturing on the basis of UV polymers and/or thermally curable polymers. UV curable polymers may be used in particular in optical effective surfaces of the manufactured optical components, while thermally curable polymers may be used in particular in non-transparent areas, i.e. outside optically effective, effective surfaces of the manufactured optical components.

In contrast to conventional technology, the optical components may not be located on glass substrates which are then stacked for the manufacturing of complex modules. Instead, the polymer lenses may be generated on a common temporary substrate without using substrates remaining in the optical path, in several molding processes executed one after the other, wherein the substrate may not exist anymore in the later setup. The temporary substrate may thus be very thick and thus mechanically stable and in particular comprise a very low deflection.

The layers molded on top of each other, i.e. for example the molded polymer lens layers or the individually molded and cured structures which, for example, form a layer setup and which may be continuous and also discontinuous, may be formed from different materials and thus comprise different mechanical, optical, chemical and electrical characteristics. In areas next to the optical functional surfaces the layer setup may comprise breakthroughs which enable media like liquids and gasses access from the exterior area through parts of the layer setup up to desired layer sheets. By selecting the materials of the individual layers it may thus among others be achieved that a solvent is led from the outside to a certain layer (for example a first structure 220 according to FIG. 2a) in the layer stack and the material of the layer is removed by being converted into the dissolved state. At the position of the original layer, which mainly comprises a non-continuous structure across the surface of the substrate, then an air space results (for example an air space 270 according FIG. 2b). By using such so-called sacrificial layers thus air spaces may be manufactured with a high lateral and axial precision without stacking several block substrates or polymer lens layers, as it is practiced in "monolithic lens technology".

The breakthrough areas next to the areas used for the optical function may take a large surface portion, so that the optically used surface is virtually connected via bridges to the periphery.

Further, in embodiments, apart from layers applied by means of UV replication, metallic and also dielectric layers may be applied by corresponding methods (wafer deposition from gas or liquid phase), which may be discontinuous by masking or lift-off methods also across the surface of the substrate. Metallic layers may here, in particular, be applied for realizing electrically conductive structures. The same may, in particular, be used for realizing capacitor elements. Molding/deposing the layers may further be done in structures (spacer wafers) having through holes or cavities. Such "spacer wafers" (for example, formed from spacer structure 510 according to FIGS. 5a and 5b) are in this respect for example fixed on the temporary substrate in a suitable position of the layer sequence and the lens layer to be manufactured by molding is therefore discontinuous across the substrate surface. The additional structures may be manufactured from a different material than the layers an in particular be non-transparent. Advantageously, the material of the "spacer wafers" (so called "spacer material") and the layer materials may be adapted regarding the thermal coefficient of expansion. An adaption to the thermal coefficient of expansion of the temporary substrate is not imperative.

According to further embodiments, for manufacturing spacer structures or optically non-transparent areas between several optical components which for example serve for suppressing false light, no additional "spacer wafer" has to be applied onto a substrate or a temporary wafer of the optical components. Molding the layers of the optical components may be executed on the temporary wafer so that spatially separated modules (for example the optical components 800, 800' according to FIGS. 8a and 8b) result. Black or non-transparent polymer may be cast into areas (for example into the free space 260 according to FIGS. 8a and 8b) between the modules or between the optical components and is for example thermally cured there by UV radiation in order to form the spacer structures or a cast "spacer wafer".

Independent of how the spacer structures or the "spacer wafers" are generated, the temporary wafer may then be dissolved by a solvent bath from the molded modules, i.e. the optical components which are embedded in the "spacer wafer" arranged or cast on the temporary substrate.

The spacer structures, after separating the individual optical components from each other, may then form non-transparent sidewalls of the individual optical components. In particular, the spacer structures may comprise tongues and/or grooves and/or perforations on their surfaces.

The parameters of the optical components to be manufactured by molding, i.e. for example the structures to be manufactured from curable materials or the optical components, like for example profile course, thickness, boundary, distance to neighbors etc. may vary across the surface of the substrate.

Due to the layer setup, in embodiments, i.e. for example in opto-electronical mechanical systems, with optical components or structures to be manufactured without a glass wafer or a glass substrate remaining in the final system, lenses may be realized with smaller center thicknesses than was possible up to now in conventional technology, which provide advantages regarding optical imaging quality and also regarding the building length of optical systems.

By the possibility of removing interlayers in embodiments by a suitable solvent, air spaces may be realized without joining separate wafers. This potentially leads to higher process yields and thus lower manufacturing costs.

Embodiments may be applied in the manufacturing of micro-optical electro-mechanical systems (MOMES) by replication processes like, e.g., a wafer level manufacturing of camera objectives and optical sensors.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for manufacturing an optical structure of curable material, comprising:
   molding and curing a first structure of a first curable material on a substrate;
   molding and curing a second structure of a second curable material on a first surface of the first structure facing away from the substrate, so that at the first surface of the first structure a boundary surface between the first structure and the second structure forms and so that the first structure is not covered by the second structure in a passage area; and
   introducing a solvent into the passage area after molding and curing the second structure in order to dissolve the first curable material of the first structure so that a cavity is formed between the second structure and a surface of the substrate,
   wherein the first curable material is soluble for the solvent after curing and the second curable material is insoluble for the solvent after curing,
   the method further comprising:
   molding and curing a fourth structure of the first curable material on the second structure;
   molding and curing a fifth structure of the second curable material on the fourth structure, so that the fourth structure is not covered at the passage area; and
   wherein introducing the solvent into the passage area is further executed after molding and curing the fifth structure in order to further dissolve the first curable material of the fourth structure, so that further a further cavity is formed between the fifth structure and the second structure which is fluidically connected to the cavity between the second structure and the substrate.

2. The method according to claim 1, further comprising:
   molding and curing a third structure of a third curable material on a first surface of the second structure facing away from the substrate, so that at the first surface of the second structure a boundary surface forms between the second structure and the third structure and so that the passage area through the third structure is not blocked, wherein the third curable material is insoluble for the solvent after curing.

3. The method according to claim 1, further comprising:
   molding and curing a further curable material in an exposed second area of the surface of the substrate, wherein the further curable material after curing is impermeable for radiation for a useful wavelength range for which the second curable material is permeable after curing.

4. The method according to claim 1, further comprising:
   removing the substrate.

5. The method according to claim 1, wherein the substrate is covered by a connecting material which is soluble for the solvent so that when introducing the solvent the spacer material is dissolved and the substrate is removed from the optical structure to be manufactured.

6. The method according to claim 1,
   wherein the optical structure is an optical lens.

7. The method according to claim 1,
   wherein molding and curing of the second structure is performed such that a surface of the second structure facing away from the substrate is a non-plane surface which forms together with the boundary surface an optical component.

8. The method according to claim 1,
   wherein, when curing the second structure, the passage area is created by a selective irradiation of the second structure such that only those areas of the second curable material are irradiated which are to be present in the later optical structure.

* * * * *